US009970210B2

(12) United States Patent
Onishi

(10) Patent No.: US 9,970,210 B2
(45) Date of Patent: May 15, 2018

(54) COMBINED CYCLE PLANT AND PLANT BUILDING THEREOF

(71) Applicant: MITSUBISHI HITACHI POWER SYSTEMS, LTD., Kanagawa (JP)

(72) Inventor: Tsugushi Onishi, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days. days.

(21) Appl. No.: 15/128,529

(22) PCT Filed: Apr. 1, 2015

(86) PCT No.: PCT/JP2015/060376
§ 371 (c)(1),
(2) Date: Sep. 23, 2016

(87) PCT Pub. No.: WO2015/166761
PCT Pub. Date: Nov. 5, 2015

(65) Prior Publication Data
US 2017/0138079 A1    May 18, 2017

(30) Foreign Application Priority Data

Apr. 30, 2014  (JP) .................................. 2014-093990

(51) Int. Cl.
*E04H 5/02* (2006.01)
*B66C 17/00* (2006.01)
(Continued)

(52) U.S. Cl.
CPC ............... *E04H 5/02* (2013.01); *B66C 17/20* (2013.01); *E04B 1/24* (2013.01); *F01D 15/10* (2013.01);
(Continued)

(58) Field of Classification Search
CPC ... E04H 5/02; F01K 11/02; F01K 7/16; F01D 15/10; F02C 6/18; F02C 7/055;
(Continued)

(56) References Cited

U.S. PATENT DOCUMENTS 3,283,923 A  *  11/1966  Schnyder .................. E04B 7/16
212/166
3,961,712 A  *   6/1976  Bartley ................... B66C 17/00
212/315
(Continued)

FOREIGN PATENT DOCUMENTS

JP         60-062621         4/1985
JP         62-016702         1/1987
(Continued)

OTHER PUBLICATIONS

International Search Report dated Jul. 7, 2015 in International Application No. PCT/JP2015/060376.
(Continued)

*Primary Examiner* — Rodney Mintz
(74) *Attorney, Agent, or Firm* — Wenderoth, Lind & Ponack, L.L.P.

(57) ABSTRACT

A plant building includes: a building main body that continues in an array direction in which a plurality of single-shaft combined units are arrayed, and has a roof that covers the upper side of the plurality of single-shaft combined units; a first overhead crane that is disposed inside the building main body, and has a girder capable of traveling in the array direction across a region including the upper side of gas turbines of the plurality of single-shaft combined units; and a second overhead crane that is disposed inside the building main body, and has a girder capable of traveling in
(Continued)

the array direction across a region including the upper side of steam turbines of the plurality of single-shaft combined units.

8 Claims, 9 Drawing Sheets

(51) Int. Cl.
  *B66C 17/20* (2006.01)
  *E04B 1/24* (2006.01)
  *F01D 15/10* (2006.01)
  *F01K 7/16* (2006.01)
  *F02C 6/18* (2006.01)
  *F02C 7/055* (2006.01)
  *F01K 11/02* (2006.01)

(52) U.S. Cl.
  CPC ............... *F01K 7/16* (2013.01); *F01K 11/02* (2013.01); *F02C 6/18* (2013.01); *F02C 7/055* (2013.01); *F05D 2220/32* (2013.01); *F05D 2220/72* (2013.01); *F05D 2220/76* (2013.01); *F05D 2230/68* (2013.01)

(58) Field of Classification Search
  CPC ....... B66C 17/20; E04B 1/24; F05D 2220/76; F05D 2220/32; F05D 2220/72; F05D 2230/68
  See application file for complete search history.

(56) References Cited

U.S. PATENT DOCUMENTS

| | | | | | |
|---|---|---|---|---|---|
| 4,717,030 | A | * | 1/1988 | Ebata | F01D 25/285 212/271 |
| 5,577,362 | A | * | 11/1996 | Yamashita | E04B 1/24 52/745.03 |
| 6,449,957 | B1 | * | 9/2002 | Takamatsu | F01D 25/28 60/796 |
| 6,880,324 | B2 | * | 4/2005 | Tanaka | F01K 23/105 60/39.182 |
| 7,308,792 | B2 | * | 12/2007 | Alf | F01K 11/02 60/653 |
| 7,726,264 | B2 | * | 6/2010 | Kawaguchi | F22B 37/001 122/450 |
| 7,966,727 | B2 | * | 6/2011 | Kawashima | E04H 5/02 29/890.03 |
| 8,251,298 | B2 | * | 8/2012 | Tatehira | E04H 5/02 122/459 |
| 2001/0003242 | A1 | * | 6/2001 | Takamatsu | F01D 25/28 60/802 |
| 2002/0023424 | A1 | * | 2/2002 | Takamatsu | F01D 25/28 60/39.08 |
| 2002/0157327 | A1 | * | 10/2002 | Aoki | B64G 1/22 52/71 |
| 2004/0088966 | A1 | * | 5/2004 | Tanaka | F01K 23/105 60/39.182 |
| 2005/0235595 | A1 | * | 10/2005 | Ryan | E04B 1/24 52/633 |
| 2005/0247060 | A1 | * | 11/2005 | Alf | F01K 11/02 60/646 |
| 2007/0089295 | A1 | * | 4/2007 | Kawashima | E04H 5/02 29/890 |
| 2007/0089296 | A1 | * | 4/2007 | Tatehira | E04H 5/02 29/890 |
| 2008/0028723 | A1 | * | 2/2008 | Nakamitsu | F22B 37/24 52/745.05 |
| 2010/0000955 | A1 | * | 1/2010 | Nakamitsu | B66C 1/10 212/270 |
| 2015/0143769 | A1 | * | 5/2015 | Yoshida | C10J 3/00 52/638 |
| 2015/0183621 | A1 | * | 7/2015 | Koch | B66C 17/20 212/315 |

FOREIGN PATENT DOCUMENTS

| | | | |
|---|---|---|---|
| JP | 62-130995 | | 6/1987 |
| JP | 08-200092 | | 8/1996 |
| JP | 09-079005 | | 3/1997 |
| JP | 10-037708 | | 2/1998 |
| JP | 11-036814 | | 2/1999 |
| JP | 11-062621 | | 3/1999 |
| JP | 3095749 | | 10/2000 |
| JP | 2001082106 A | * | 3/2001 |
| JP | 2001-107745 | | 4/2001 |
| JP | 2001-227304 | | 8/2001 |
| JP | 2004-162620 | | 6/2004 |

OTHER PUBLICATIONS

Written Opinion of the International Searching Authority dated Jul. 7, 2015 in International Application No. PCT/JP2015/060376.
Office Action dated Feb. 28, 2017 in corresponding Chinese Application No. 201580015386.6, with English Translation.
Office Action dated Nov. 17, 2017 in corresponding German patent application No. 112015002062.4, with English translation.
Lechner, Christof; Seume, Jorg: "Stationare Gasturbinen", 1st edition, Berlin Heidelberg, Springer-Verlag, 2003, pp. 83-89, pp. 287-291.

\* cited by examiner

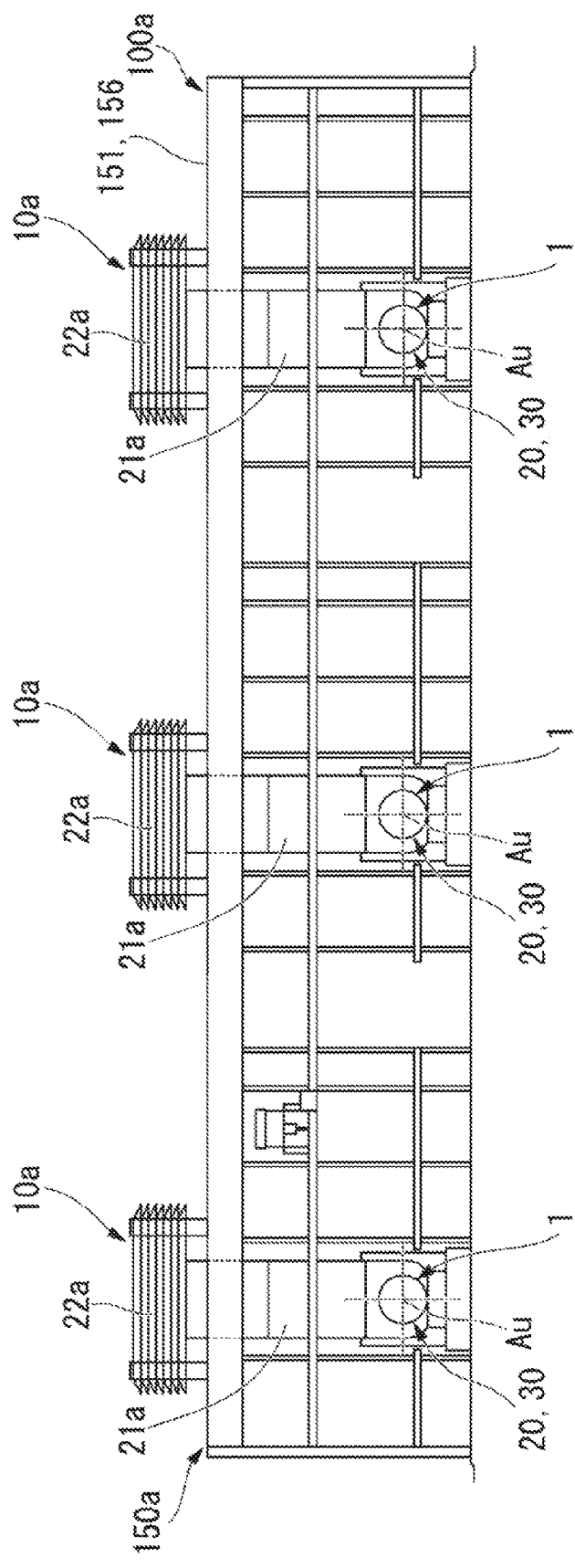

COMBINED CYCLE PLANT AND PLANT BUILDING THEREOF

TECHNICAL FIELD

The present invention relates to a combined cycle plant that includes a plurality of single-shaft combined units each having a gas turbine, a generator, and a steam turbine disposed on the same axis, and to a plant building of the combined cycle plant. The present application claims priority on Japanese Patent Application No. 2014-093990 filed on Apr. 30, 2014, the contents of which are incorporated herein by reference.

BACKGROUND ART

One example of combined cycle plants is described in Patent Literature 1. This combined cycle plant includes a plurality of single-shaft combined units, exhaust heat recovery boilers provided respectively for the plurality of single-shaft combined units, a building main body that covers the plurality of single-shaft combined units, and one overhead crane provided inside the building main body.

The single-shaft combined unit includes a generator, a steam turbine, and a gas turbine. In the single-shaft combined unit, the generator, the steam turbine, and the gas turbine are disposed in this order on the same axis. The exhaust heat recovery boiler is disposed on a first side from the gas turbine, opposite from the steam turbine in an axial direction in which the axis extends. The exhaust heat recovery boiler generates steam using the heat of exhaust gas discharged from the gas turbine. This steam is used as steam for driving the steam turbine. The axes of the plurality of single-shaft combined units are disposed in parallel to one another.

The overhead crane has a pair of travel rails that extend in an array direction in which the plurality of single-shaft combined units are arrayed, a girder that is supported by the pair of travel rails and capable of traveling in the array direction, a plurality of first crane columns that support one travel rail on the first side of the pair of travel rails, and a plurality of second crane columns that support the other travel rail on a second side, opposite from the first side, of the pair of travel rails. Both the plurality of first crane columns and the plurality of second crane columns are arrayed in the array direction. The plurality of first crane columns are disposed on the first side of the gas turbine in the axial direction. The plurality of second crane columns are disposed at the position of the generator in the axial direction.

The building main body has a roof that continues in the array direction and covers the upper side of the plurality of single-shaft combined units, and, columns that support the roof. The columns of the building, main body include a plurality of first building columns that are disposed on the first side in the axial direction relative to the first crane columns and a plurality of second building columns that are disposed on the second side in the axial direction relative to the second crane columns. Both the plurality of first building columns and the plurality of second building columns are arrayed in the array direction.

CITATION LIST

Patent Literature

Patent Literature 1: Japanese Patent Laid-Open No. 09-079005 (FIG. 1, FIG. 2)

SUMMARY OF INVENTION

Technical Problem

In the combined cycle plant described in Patent Literature 1, the plurality of single-shaft combined units can be inspected and repaired with the one overhead crane. In terms of operational costs, it is desirable that the period of inspection and repair is as short as possible. However, since only the one overhead crane is available in the combined cycle plant of Patent Literature 1, even when one single-shaft combined unit is to be inspected and repaired, the period of inspection and repair of that one, single-shaft combined unit is prolonged.

In the combined cycle, plant described in Patent Literature 1, the girder of the one overhead crane travels across a region including the upper side of the plurality of single-shaft combined units in the array direction of these units. For this reason, in the combined cycle plant described in Patent Literature 1, the building columns cannot be disposed inside the region across which the girder travels, so that there is a long span between the columns, especially in the axial direction of the single-shaft combined units. In this connection, the combined cycle plant described in Patent Literature 1 employs crossbeams with a high section modulus as crossbeams for supporting the roof, so that the weight of the crossbeams is large. Moreover, the columns supporting these crossbeams are also required to have a high section modulus. Then, the foundation supporting these columns needs to be increased in size. Thus, the combined cycle plant described in Patent Literature 1 involves high construction costs of the plant building.

Therefore, a first object of the invention according to the present application is to provide a plant building that can shorten the period of inspection and repair of single-shaft combined units and a combined cycle plant including this plant building. A second object of the invention according to the present application is to provide a plant building that can keep down the construction costs and a combined cycle plant including this plant building.

Solution to Problem

A plant building as one aspect of the present invention for achieving the first object is a plant building of a combined cycle plant that includes a plurality of single-shaft combined units each having a gas turbine, a generator, and a steam turbine disposed on the same axis, the axes of the plurality of single-shaft combined units being parallel to one another, the plant building including: a building main body having a roof that continues in an array direction in which the plurality of single-shall combined units are arrayed and covers the upper side of the plurality of single-shaft combined units; a first overhead crane that is disposed inside the building main body, and has a girder capable of traveling in the array direction across a region including the upper side of the gas turbines of the plurality of single-shaft combined units; and a second overhead crane that is disposed inside the building main body, and has a girder capable of traveling in the array direction across a region including the upper side of the steam turbines of the plurality of single-shaft combined units.

In this plant building, the first overhead crane can be used to disassemble and assemble the gas turbines of the single-shaft combined units. In this plant building, the second overhead crane can be used to disassemble and assemble the steam turbines of the single-shall combined units. Thus, in this plant building, it is possible to concurrently perform disassembly and assembly of the gas turbine and those of the steam turbine of the single-shaft combined unit by using the first overhead crane and the second overhead crane.

In this plant building, it is possible to concurrently perform disassembly and assembly of the gas turbine of one single-shaft combined unit and disassembly and assembly of the steam turbine of another single-shaft combined unit. That is, in this plant building, it is possible to concurrently perform disassembly and assembly of two single-shaft combined units.

In this plant building, even when three or more single-shaft combined units are disposed inside the plant building, each of the three or more single-shaft combined units can be disassembled and assembled with the two overhead cranes.

It is preferable that the positions of the steam turbines of the plurality of single-shall combined units on the gas turbine side in the axial direction are aligned, or that the positions of the gas turbines of the plurality of single-shaft combined units on the steam turbine side in the axial direction are aligned.

A plant building as a second aspect according to the present invention for achieving the first object is the above-described plant building, wherein the first overhead crane and the second overhead crane may each have a pair of travel rails that are parallel to each other and extend in the array direction, and the girders may be respectively supported by the pairs of travel rails so as to be able to travel in the array direction.

In the plant building in which the overhead cranes each have the travel rails, the building main body may have first support parts that support each of the pair of travel rails of the first overhead crane and second support parts that support each of the pair of travel rails of the second overhead crane.

In the plant building that has the first support parts and the second support parts, the first support parts may include first outer support parts and first inner support parts that respectively support, of the pair of travel rails of the first overhead crane, one travel rail on a first side that is the side of the gas turbine from the steam turbine in an axial direction in which the axis extends, and the other travel rail on a second side that is opposite from the first side; the second support parts may include second inner support parts and second outer support parts that respectively support one travel rail on the first side and the other travel rail on the second side of the pair of travel rails of the second overhead crane; and the first inner support parts and the second inner support parts may together constitute integral support parts.

In this plant building, the same support parts are used as some of the support parts supporting the travel rails of the first overhead crane and some of the support parts supporting the travel rails of the second overhead crane, so that the number of the support parts can be reduced. Thus, this plant building can keep down the construction costs.

In the plant building as the second aspect, the generator of the single-shaft combined unit may be disposed between the gas turbine and the steam turbine in an axial direction in which ale axis extends; the first overhead crane may be disposed on a first side that is the side of the gas turbine from the steam turbine in the axial direction; the second overhead crane may be disposed on a second side that is the side of the steam turbine from the gas turbine in the axial direction; the building main body may have first support parts that support each of the pair of travel rails of the first overhead crane and second support parts that support each of the pair of travel rails of the second overhead crane; the first support parts may include first outer support parts and first inner support parts that respectively support one travel rail on the first side and the other travel rail on the second side of the pair of travel rails of the first overhead crane; the second support parts may include second inner support parts and second outer support parts that respectively support one travel rail on the first side and the other travel rail on the second side of the pair of travel rails of the second overhead crane; and the first inner support parts and the second inner support parts may be disposed in a region where the generators are located in the axial direction.

In the plant building of the combined cycle plant in which the generator is disposed between the gas turbine and the steam turbine, the first inner support pans and the second inner support parts may together constitute integral support parts.

In this plant building, the same support parts are used as some of the support parts supporting the travel rails of the first overhead crane and some of the support parts supporting the travel rails of the second overhead crane, so that the number of the support parts can be reduced. Thus, this plant building can keep down the construction costs.

In any one of the above-described plant buildings that have the first support parts and the second support parts, the first support parts and the second support parts may also support the roof.

In this plant building, the span in the axial direction between the plurality of support parts supporting the roof can be shortened. Moreover, in this plant building, the first support parts supporting the first overhead crane and the second support parts supporting the second overhead crane also support the roof, so that the number of the support parts as the components of the plant building can be reduced compared with when columns etc. for the overhead cranes are separately provided.

A plant building as a third aspect that is one aspect according to the present invention for achieving the second object is a plant building of a combined cycle plant that includes a plurality of single-shaft combined units each having a gas turbine, a generator, and a steam turbine disposed on the same axis, the axes of the plurality of single-shaft combined units being parallel to one another, the plant building including: a roof that continues in an array direction in which the plurality of single-shaft combined units are arrayed and covers the upper side of the plurality of single-shaft combined units; a plurality of first outer support parts supporting the roof that are disposed, relative to the gas turbines of the plurality of single-shaft combined units, on a first side that is the side of the gas turbine from the steam turbine in an axial direction in which the axis extends, and are arrayed in the array direction; a plurality of second outer support parts supporting the roof that are disposed, relative to the steam turbines of the plurality of single-shaft combined units, on a second side that is opposite from the first side in the axial direction, and are arrayed in the array direction; and a plurality of inner support pans supporting the roof that are disposed in a region between the gas turbines and the steam turbines of the plurality of single-shaft combined units in the axial direction, and are arrayed in the array direction.

In this plant building, the span in the axial direction between the plurality of support pans supporting, the roof can be shortened.

Here, in the plant building of the third aspect, the plant building may further include: a first overhead crane that is disposed on the lower side of the roof, and has a girder capable of traveling in the array direction across a region including the upper side of the gas, turbines of the plurality of single-shaft combined units; and a second overhead crane that is disposed on the lower side of the roof, and has a girder capable of traveling in the array direction across a region including the upper side of the steam turbines of the plurality of single-shaft combined units.

As in the plant buildings of the first aspect and the second aspect, it is possible in this plant building to concurrently perform disassembly and assembly of the gas turbine and those of the steam turbine of the single-shaft combined unit by using the first overhead crane and the second overhead crane. Moreover, in this plant building, too, even when three or more single-shaft combined units are disposed inside the plant building, each of the three or more single-shaft combined units can be disassembled and assembled with the two overhead cranes.

In the plant building that includes the first overhead crane and the second overhead crane, the first overhead crane and the second overhead crane may each have a pair of travel rails that are parallel to each other and extend in the array direction, and the girders may be respectively supported by the pairs of travel rails so as to be able to travel in the array direction.

In the plant building in which the overhead cranes each have the pair of travel rails, of the pair of travel rails of the first overhead crane, one travel rail on the first side may be supported by the plurality of first outer support parts, and the other travel rail on the second side may be supported by the plurality of inner support parts; and of the pair of travel rails of the second overhead crane, one travel rail on the first side may be supported by the plurality of inner support parts, and the other travel rail on the second side may be supported by the plurality of second outer support parts.

In this plant building, the support parts supporting the roof also support the first overhead crane and the second overhead crane, so that the number of the support parts as the components of the plant building can be reduced compared with when columns etc. for the overhead cranes are separately provided.

In the plant building in which the travel rails are supported by the support parts, the plurality of inner support parts may include a plurality of first inner support parts and a plurality of second inner support parts that are disposed on the second side relative to the plurality of first inner support parts; of the pair of travel rails of the first overhead crane, the other travel rail on the second side may be supported by the plurality of first inner support parts; and of the pair of travel rails of the second overhead crane, the one travel rail on the first side may be supported by the plurality of second inner support parts.

In any one of the above-described plant buildings, including, the plant building of the third aspect, the generator of the single-shaft combined unit may be disposed between the gas turbine and the steam turbine in the axial direction, and the plurality of inner support parts may be disposed in a region where the generators of the plurality of single shaft combined units are located in the axial direction.

A combined cycle plant as a first aspect according to the invention of the present application includes: any one of the above-described plant buildings; the plurality of single-shaft combined units; an intake duct that is provided for each of the plurality of single-shaft combined units and guides air to the gas turbine, and an intake air filter that removes foreign substances contained in air flowing into the intake duct, and an exhaust heat recovery boiler that is provided for each of the plurality of single-shaft combined units and generates steam with the heat of exhaust gas discharged from the gas turbine.

Here, in this combined cycle plant, the intake air filter may be disposed on the upper side relative to the gas turbine.

A combined cycle plant as, a second aspect according to the invention of the present application includes: a plurality of single-shaft combined units each having a gas turbine, a generator, and a steam turbine disposed in this order on the same axis; any one of the above-described plant buildings for the single-shaft combined units; the plurality of single-shaft combined units; an intake duct that is provided for each of the plurality of single-shaft combined units and guides air to the gas turbine, and an intake air filter that removes foreign substances contained in air flowing into the intake duct; and an exhaust heat recovery boiler that is provided for each of the plurality of single-shaft combined units and generates steam with the heat of exhaust gas discharge from the gas turbine, wherein the intake air filter is disposed above the generator.

In the combined cycle plant as the first aspect, the intake air filter may be disposed on the lower side relative to the gas turbine.

In this case, the intake air filter may be disposed under the exhaust heat recovery boiler.

In any one of the above-described combined cycle plants, the intake air filter may be disposed in an imaginary plane that spreads in the vertical direction so as to include the axis of the single-shaft combined unit provided with the intake air filter.

In this combined cycle plant, the interval between the plurality of single-shaft combined units in the array direction can be narrowed and the space therebetween can be effectively used compared with when the intake air filter is disposed at a position offset from the imaginary plane in the array direction.

Advantageous Effects of Invention

According to one aspect of the present invention, the two overhead cranes can be concurrently used to disassemble and assemble the single-shaft combined units, so that the period of repair and inspection of the single-shaft combined units can be shortened.

According to another aspect of the present invention, the construction costs of the plant building can be kept down, since the span between the plurality of support parts supporting the roof can be shortened in the axial direction of the single-shaft combined units.

BRIEF DESCRIPTION OF DRAWINGS

FIG. 9 is a sectional view taken along the line IX-IX of FIG. 8.

DESCRIPTION OF EMBODIMENTS

In the following, embodiments of a combined cycle plant according to the present invention will be described with reference to the drawings.

First Embodiment

A first embodiment of the combined cycle plant according to the present invention will be described with reference to FIG. 1 to FIG. 5.

Figure 5:
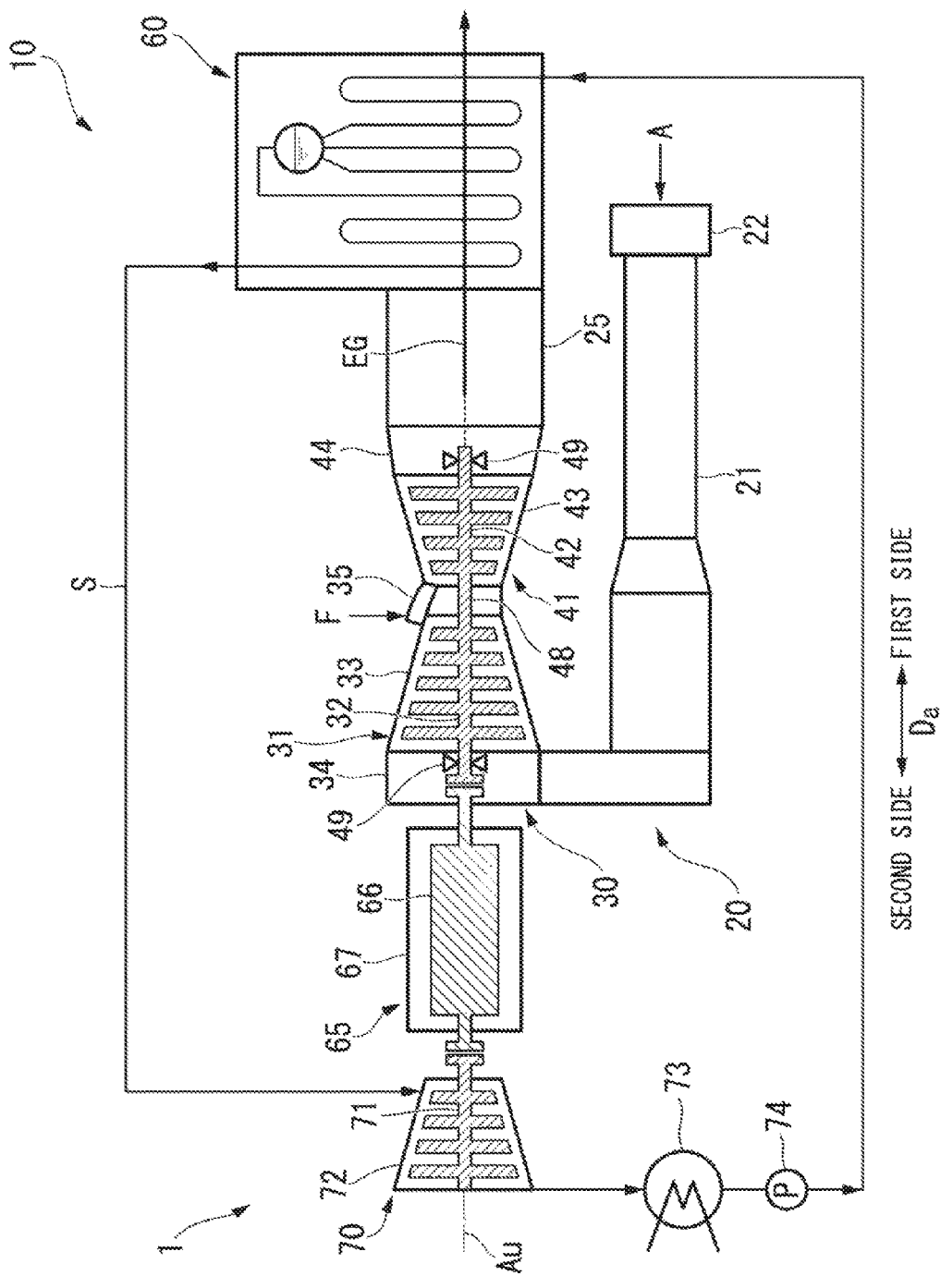
FIG. 5 is a system diagram of a combined cycle facility in the first embodiment according to the present invention.

The combined cycle plant of this embodiment includes a plurality of combined cycle facilities. As shown in FIG. 5, a combined cycle facility 10 includes a gas turbine facility 30, an exhaust heat recovery boiler 60 that generates steam S with the heat of exhaust gas EG discharged from the gas turbine facility 30, a steam turbine 70 driven by the steam S from the exhaust heat recovery boiler 60, a generator 65, a condenser 73 that turns the steam S discharged from the steam turbine 70 back into water, and a pump 74 that sends the water from the condenser 73 to the exhaust heat recovery boiler 60.

The gas turbine facility 30 has a gas turbine 30, an intake duct 21 that guides air to the gas turbine 30, an intake air filter 22 that removes foreign substances contained in air flowing into the intake duct 21, and an exhaust duct 25 that guides the exhaust gas EG from the gas turbine 30 to the exhaust heat recovery boiler 60. The gas turbine 30 has a compressor 31 that compresses air from the intake duct 21, a combustor 35 that generates combustion gas by combusting fuel inside the air compressed in the compressor 31, and a turbine 41 driven by the combustion gas.

The compressor 31 has a compressor rotor 32 that rotates around an axis, a compressor casing 33 that rotatably covers the compressor rotor 32, and an intake chamber 34 that guides air from the intake duct 21 into the compressor casing 33. The turbine 41 has a turbine rotor 42 that rotates around an axis, a turbine casing 43 that rotatably covers the turbine rotor 42, and an exhaust chamber 44 that guides the exhaust gas EG from inside the turbine casing 43 to the exhaust duct 25. The compressor rotor 32 and the turbine rotor 42 rotate around the same axis, and are coupled to each other to form a gas turbine rotor 48. One end of the gas turbine rotor 48 in the axial direction is located in the exhaust chamber 44 of the turbine 41, and the other end is located in the intake chamber 34 of the compressor 31. Both ends of the gas turbine rotor 48 are supported by bearings 49 such that the gas turbine rotor 48 can rotate.

The steam turbine 70 has a steam turbine rotor 71 that rotates around an axis, and a steam turbine casing 72 that rotatably covers the steam turbine rotor 71. The generator 65 has a generator rotor 66 that rotates around an axis, and a generator casing 67 that rotatably covers the generator rotor 66. The generator casing 67 has a stator that is disposed so as to face the generator rotor 66 from the outer circumferential side.

The axis of the steam turbine rotor 71, the axis of the generator rotor 66, and the axis of the gas turbine rotor 48 are located on the same straight line. The steam turbine rotor 71, the generator rotor 66, and the gas turbine rotor 48 are arrayed in this order and coupled to one another in an axial direction Da in which their axis Au extends. That is, the steam turbine 70, the generator 65, and the gas turbine 30 are arrayed in this order in the axial direction Da and coupled to one another to constitute a single-shaft combined unit 1.

Figure 1:
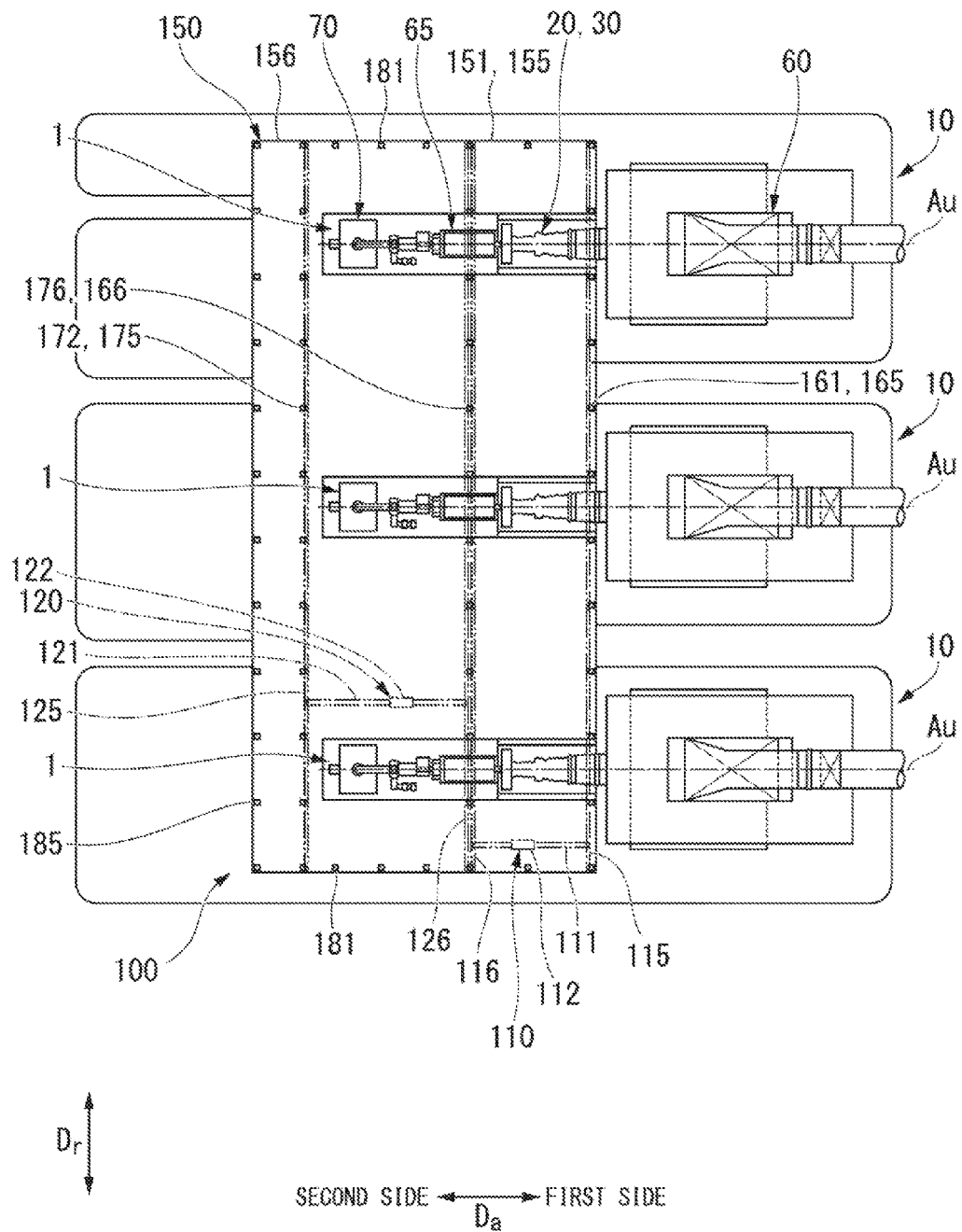
FIG. 1 is a plan view of a combined cycle plant in a first embodiment according to the present invention.
Figure 2:
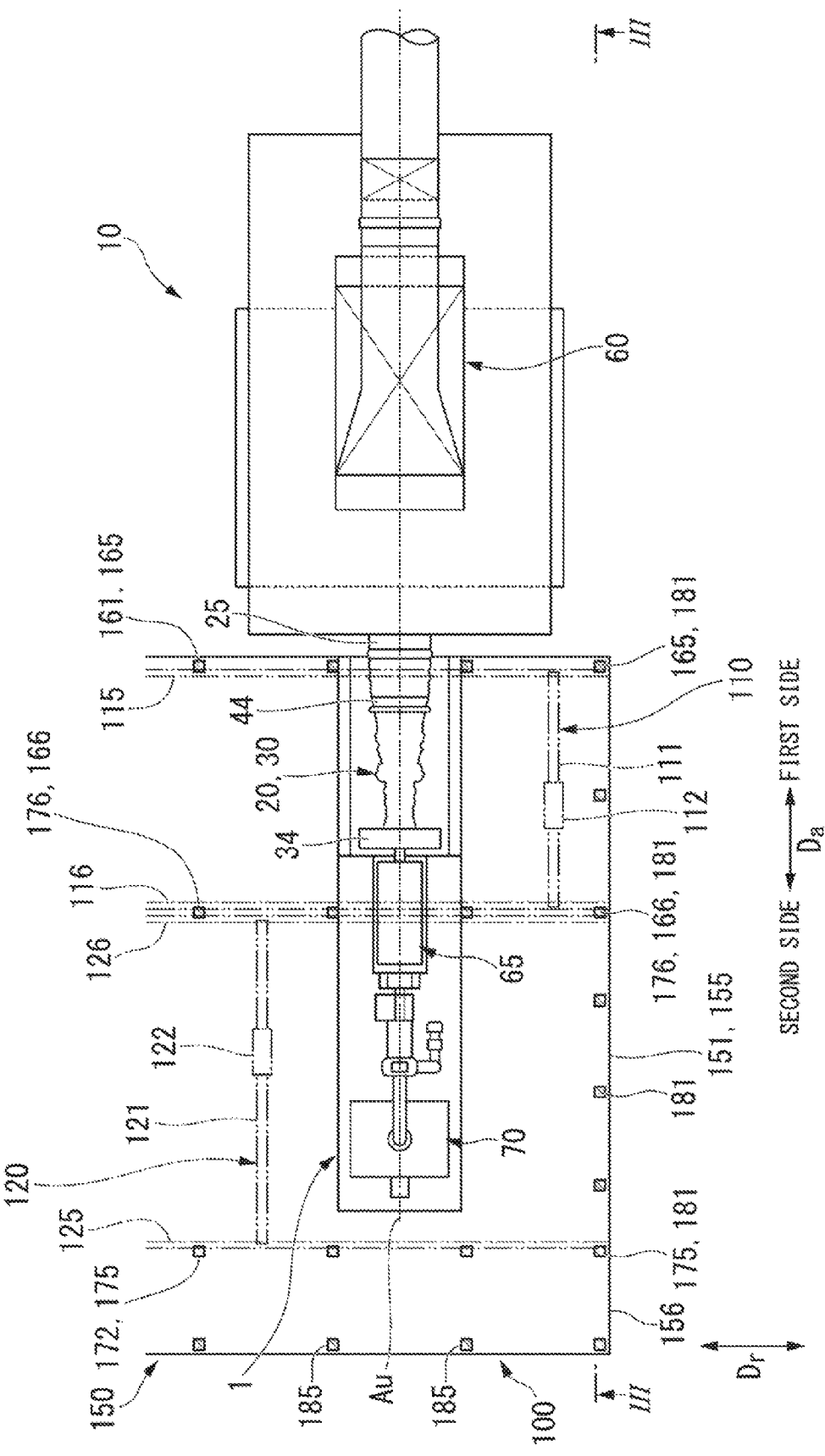
FIG. 2 is a plan view of the major part of the combined cycle plant in the first embodiment according to the present invention.
Figure 3:
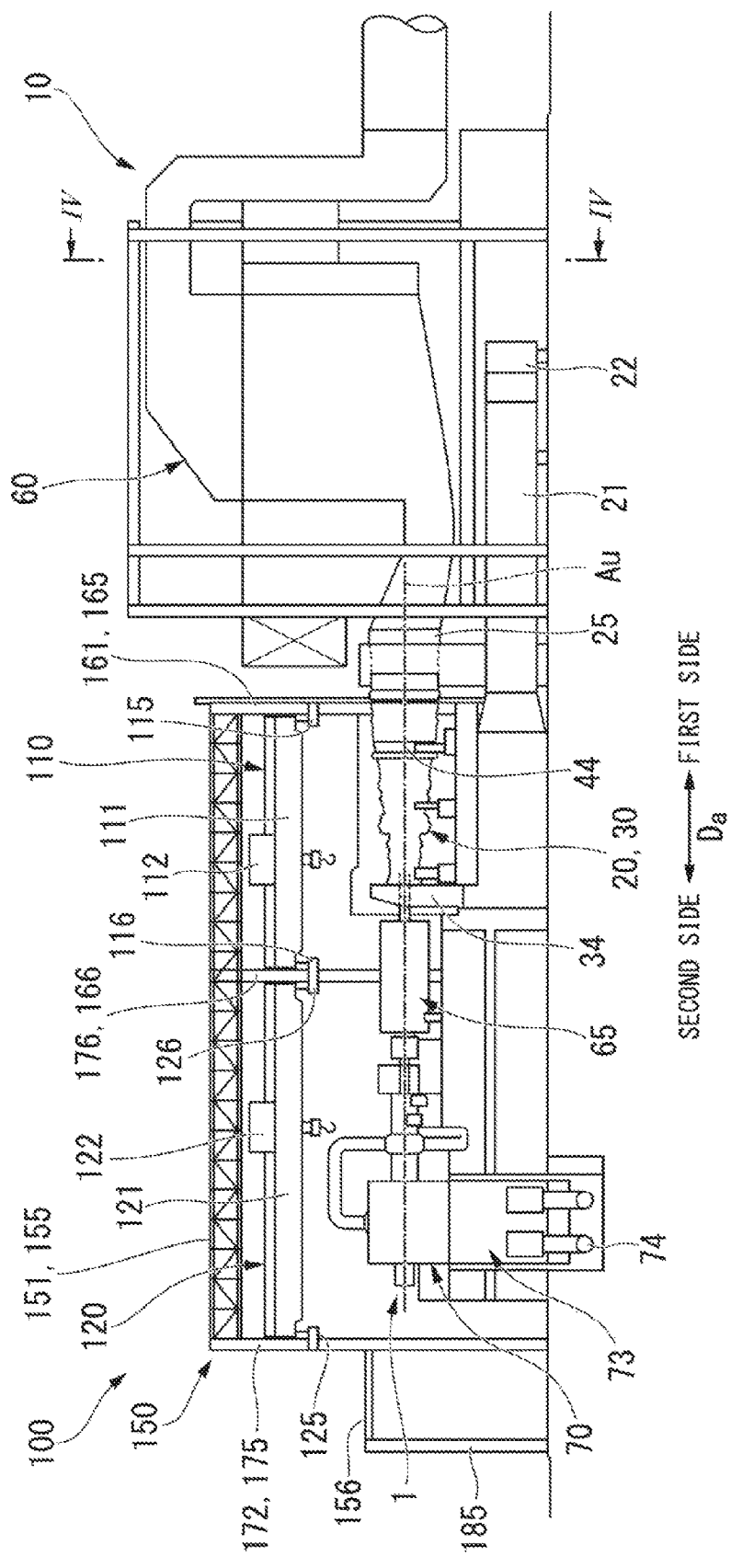
FIG. 3 is a sectional view taken along the line III-III of FIG. 2.
Figure 4:
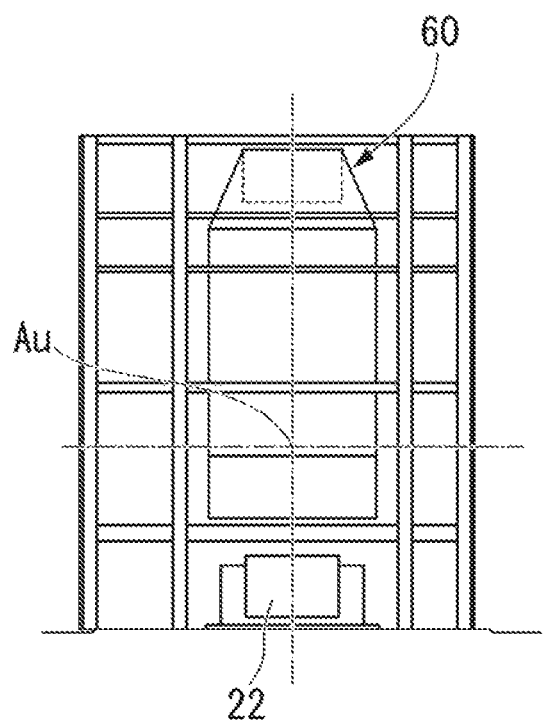
FIG. 4 is a sectional view taken along the line IV-IV of FIG. 3.

As shown in FIG. 1 to FIG. 3, the plurality of single-shaft combined units 1 are disposed such that the axes Au are parallel to one another and the positions of the generators 65 in the axial direction Da are aligned. Here, in the axial direction Da, the side of the gas turbine 30 from the steam turbine 70 will be referred to as a first side, and the opposite side will be referred to as a second side. The direction in which the plurality of single-shaft combined units 1 are arrayed will be referred to as an array direction Dr. In this embodiment, the array direction Dr is a direction perpendicular to the axial direction Da.

The intake air filter 22 (see FIG. 3), the intake duct 21 (see FIG. 3), the exhaust duct 25, and the exhaust heat recovery boiler 60 are disposed in an imaginary plane that spreads in the vertical direction so as to include the axis Au of the single-shaft combined unit 1 provided with these devices. The intake air filter 22 and the intake duct 21 are disposed on the lower side relative to the gas turbine 30. In particular, the intake air filter 22 is disposed under the exhaust heat recovery boiler 60.

The combined cycle plant of this embodiment further includes a plant building 100. The plant building 100 includes, a building main body 150 that covers the plurality of single-shaft combined units 1, and a first overhead crane 110 and a second overhead crane 120 provided inside the building main body 150.

As shown in FIG. 2 and FIG. 3, the first overhead crane 110 is disposed inside the building main body 150, and has a first girder 111 that can travel in the array direction Dr across a region including the upper side of the gas turbines 30 of the plurality of single-shaft combined units 1, a pair of first travel rails 115, 116 that are parallel to each other and extend in the array direction Dr, and a first hoist 112 mounted on the first girder 111. The first girder 111 is a beam member extending in the axial direction Da. The pair of travel rails 115, 116 support both ends or the first girder 111 such that the first girder 111 can travel in the array direction Dr. The first hoist 112 can move in the axial direction Da along the first girder 111.

The second overhead crane 120 is disposed inside the building main body 150, and has a second girder 121 that can travel in the array direction Dr across a region including the upper side of the steam turbines 70 of the plurality of single-shaft combined units 1, a pair of second travel rails 125, 126 that are parallel to each other and extend in the array direction Dr, and a second hoist 122 mounted on the second girder 121. The second girder 121 is a beam member extending in the axial direction Da. The pair of second travel rails 125, 126 support both ends of the second girder 121 such that the second girder 121 can travel in the array direction Dr. The second hoist 122 can move in the axial direction Da along the second girder 121.

As shown in FIG. 1 to FIG. 4, the building main body 150 includes a plurality of first support columns (first support parts) 161 that support each of the pair of first travel rails 115, 116, a plurality of second support columns (second support parts) 172 that support each of the pair of second travel rails 125, 126, and a roof 151 that continues in the array direction Dr and covers the upper side of the plurality of single-shaft combined units 1.

The plurality of first support columns 161 include a plurality of first outer support columns 165 and a plurality of first inner support columns 166 that respectively support the first travel rail 115 on the first side and the first travel rail 116 on the second side of the pair of first travel rails 115, 116. Both the plurality of first outer support columns 165 and the plurality of first inner support columns 166 are arrayed in the array direction Dr. The plurality of first outer support columns 165 are disposed at positions on the first side relative to the gas turbine 30 in the axial direction Da, more specifically, at positions where the exhaust duct 25 is located in the axial direction Da. The plurality of first inner support columns 166 are disposed at positions where the generator 65 is located in the axial direction Da.

The plurality of second support columns 172 include a plurality of second inner support columns 176 and a plurality of second outer support columns 175 that respectively support the second travel rail 126 on the first side and the second travel rail 125 on the second side of the pair of second travel rails 125, 126. Both the plurality of second inner support columns 176 and the plurality of second outer support columns 175 are arrayed in the array direction Dr. The plurality of second inner support columns 176 are disposed at positions where the generator 65 is located in the axial direction Da. The plurality of second outer support columns 175 are disposed at positions on the second side relative to the steam turbine 70 in the axial direction Da.

In this embodiment, the same columns constitute the inner support columns (inner support parts), the plurality of first inner support columns 166 and the plurality of second inner support columns 176. The inner support columns are located in a center part of the generator 65 in the axial direction Da.

The building main body 150 further includes a plurality of building exterior columns 181 that are disposed on both sides in the array direction Dr from a unit group that is a collection of the plurality of single-shaft combined units 1, and a plurality of auxiliary building exterior columns 185 that are disposed on the second side relative to the plurality of second outer support columns 175.

The plurality of building exterior columns 181 are arrayed in the axial direction Da. Of the plurality of building exterior columns 181, those columns that are located at positions where the plurality of first support columns 161 are arrayed function as the first support columns 161. Of the plurality of building exterior columns 181, those columns that are located at positions where the plurality of second support columns 172 are arrayed function as the second support columns 172. The plurality of auxiliary building exterior columns 185 are arrayed in the array direction Dr.

The roof 51 has a first roof 155 that covers the upper side of the plurality of single-shaft combined units 1, and a second roof 156 that is disposed on the second side relative to the first roof 155 and covers the upper side of auxiliaries (not shown) etc. The first roof 155 is supported by the plurality of first support columns 161, the plurality of second support columns 172, and a column group on the first side of the plurality of building exterior columns 181. The second roof 156 is supported by the plurality of second outer support columns 175, the plurality of auxiliary building exterior columns 185, and a column group on the second side of the plurality of building exterior columns 181.

Next, inspection and repair of the combined cycle plant having been described above will be described.

In the inspection and repair of the combined cycle plant, it is possible, but rare, to stop all the plurality of combined cycle facilities 10 and perform inspection and repair of the plurality of combined cycle facilities 10 in the same period. In most cases, one of the plurality of combined cycle facilities 10 is stopped, and this combined cycle facility 10 is inspected and repaired while the other combined cycle facilities 10 are kept in operation.

To inspect and, repair the gas turbine 30 of one combined cycle facility 10, the gas turbine 30 is disassembled and assembled using the first overhead crane 110. Both the compressor casing 33 and the turbine casing 43 of the gas turbine 30 have a structure that can be split into upper and lower halves. Therefore, to disassemble the gas turbine 30, for example, the upper-half compressor casing and the upper-half turbine casing are lifted by the first overhead crane 110. Thereafter, the gas turbine rotor 48 is lifted by the first overhead crane 110.

On the other hand, to inspect and repair the steam turbine 70 of the combined cycle facility 10, the steam turbine 70 is disassembled and assembled using the second overhead crane 120. The steam turbine casing 72 also has a structure that can be split into upper and lower halves. Therefore, to disassemble the steam turbine 70, for example, the upper-half steam turbine casing is lifted by the second overhead crane 120. Thereafter, the steam turbine rotor 71 is lifted by the second overhead crane 120.

Thus, in this embodiment, it is possible to concurrently perform disassembly and assembly of the gas turbine 30 and those of the steam turbine 70 of the single-shaft combined unit 1 by using the first overhead crane 110 and the second overhead crane 120. In this embodiment, therefore, the period of inspection and repair of one single-shaft combined unit 1 can be shortened. To inspect and repair the gas turbine 30, the second overhead crane 120 may be used as necessary along with the first overhead crane 110. On the other hand, to inspect and repair the steam turbine 70, the first overhead crane 110 may be used as necessary along with the second overhead crane 120.

In this embodiment, it is possible to concurrently perform disassembly and assembly of the gas turbine of one single-shaft combined unit and disassembly and assembly of the steam turbine of another single-shaft combined unit. That is, in this embodiment, it is possible to concurrently perform disassembly and assembly of two single-shaft combined units.

In this embodiment, even when the combined cycle plant includes three or more single-shaft combined units 1, each of the three or more single-shaft combined units 1 can be disassembled and assembled using the two overhead cranes 110, 120. In this embodiment, therefore, the manufacturing costs of the plant building 100 can be kept down compared with when an overhead crane is provided for each of the plurality of single-shaft combined units 1.

The rotor and the stator of the generator 65 are heavy objects. Accordingly, the generator 65 is heavier than the steam turbine 70 or the gas turbine 30. In addition, in most cases, the generator casing 67 does not have a structure that can be split into upper and lower halves. Therefore, in the disassembly and assembly of the generator 65, for example, the generator 65 is shifted from the axis Au of the single-shaft combined unit 1 in a direction perpendicular to the axis Au by means of a plurality of jacks etc., and the generator rotor 66 is pulled out in the axial direction Da from the casing 67 of the shifted generator 65 by means of a chain block etc. Thus, there is little need for placing the hoists 112, 122 of the overhead cranes 110, 120 directly above the generator 65 for the disassembly and assembly of the generator 65.

Accordingly, in this embodiment, the generators 65 are disposed at positions on the border between the first overhead crane 110 and the second overhead crane 120 in the axial direction Da. In other words, in this embodiment, the first travel the second side of the pair of first travel rails 115, 116, the first inner support columns 166 supporting the first travel rail 116, the second travel rail 126 on the first side of the pair of second travel rails 125, 126, and the second inner support columns 176 supporting the second travel rail 126 are disposed in the region where the generators 65 are located in the axial direction Da.

In this embodiment, the span between the columns in the axial direction Da can be shortened by thus disposing the support columns 166, 167, which also support the roof 151, in the region where the generators 65 are located in the axial direction Da. In this connection, in this embodiment, crossbeams with a lower section modulus can be used as crossbeams for supporting the roof 151, and thereby the weight of the crossbeams can be reduced. That is, in this embodiment, the weight of the entire roof structure including the roof 151 and the crossbeams thereof can be reduced. Moreover, the columns supporting these crossbeams are not required to have a high section modulus, either. In addition, the foundation supporting the columns can be reduced in size. Thus, from these points of view, too, the construction costs of the plant building 100 can be kept down in this embodiment.

In this embodiment, the first support columns 161 supporting the first overhead crane 110 and the second support columns 172 supporting the second overhead crane 120 also support the roof 151, so that the construction costs of the plant building 100 can be kept down compared with when columns for the overhead cranes are separately provided.

In this embodiment, the intake air filter 22 connected to the single-shaft combined unit 1 is provided in an imaginary plane spreading in the vertical direction so as to include the axis Au of the single-shaft combined unit 1. Thus, in this embodiment, the interval between the plurality of single-shaft combined units 1 in the array direction Dr can be narrowed and the space therebetween can be effectively used compared with when the intake air filter is disposed at a position offset from the imaginary plane in the array direction Dr.

Second Embodiment

A second embodiment of the combined cycle plant according to the present invention will be described with reference to FIG. 6 to FIG. 9.

Figure 6:
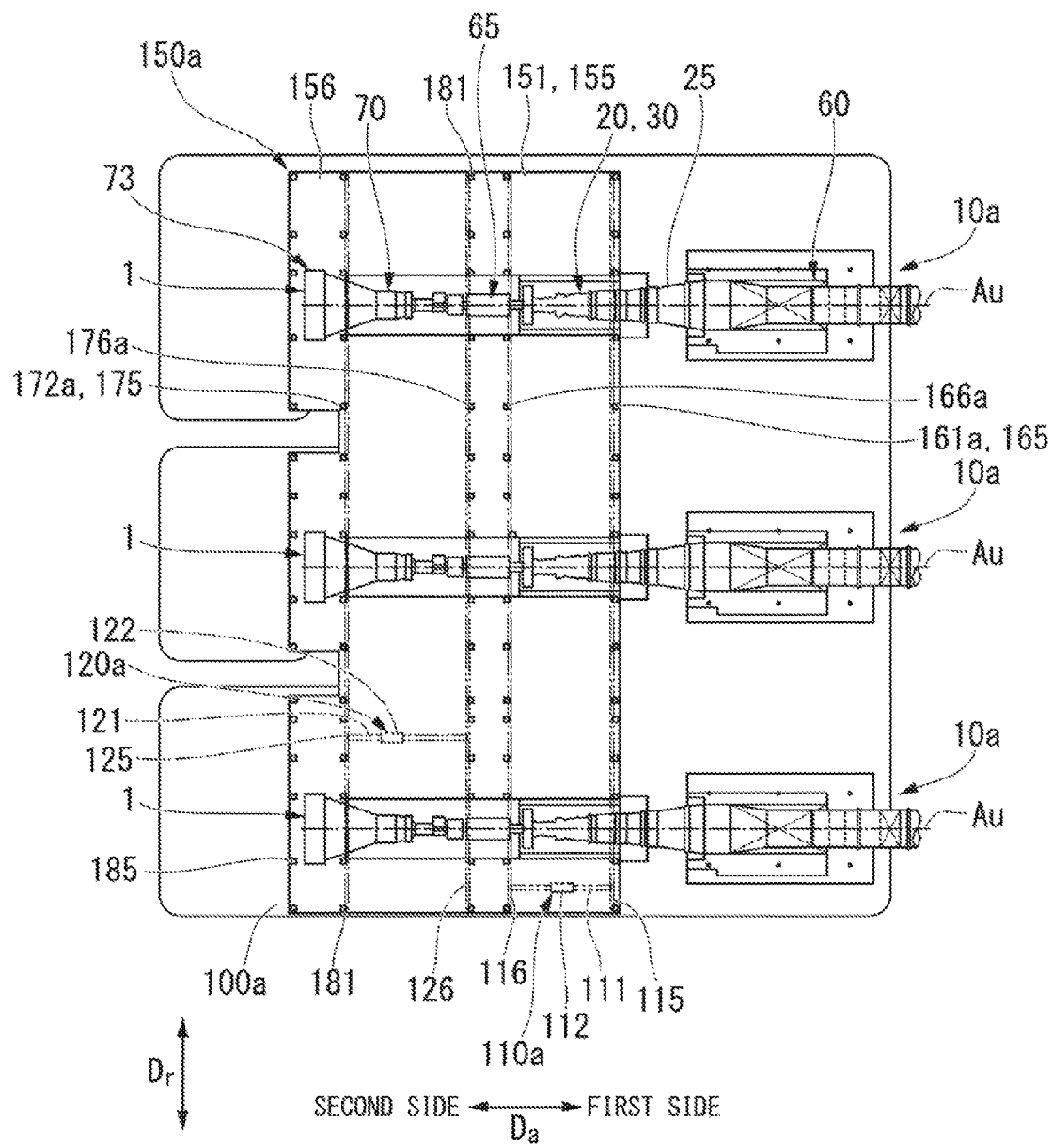
FIG. 6 is a plan view of a combined cycle plant in a second embodiment according to the present invention.

As shown in FIG. 6, the combined cycle plant of this embodiment includes a plurality of combined cycle facilities 10a as in the first embodiment. The components of the combined cycle facility 10a of this embodiment are the same as the components of the combined cycle facility 10 of the first embodiment. Moreover, the components of a plant building 100a of this embodiment are the same as the components of the plant building 100 of the first embodiment. However, the arrangement of an intake air filter 22a (see FIG. 8 and FIG. 9), which is one of the components of the combined cycle facility 10a of this embodiment, is different from that of the first embodiment. In this connection, the arrangement of a first overhead crane 110a and a second overhead crane 120a as well as the arrangement of some of the columns of a building main body 150a in the plant building 100a of this embodiment are also different from those of the first embodiment.

Figure 7:
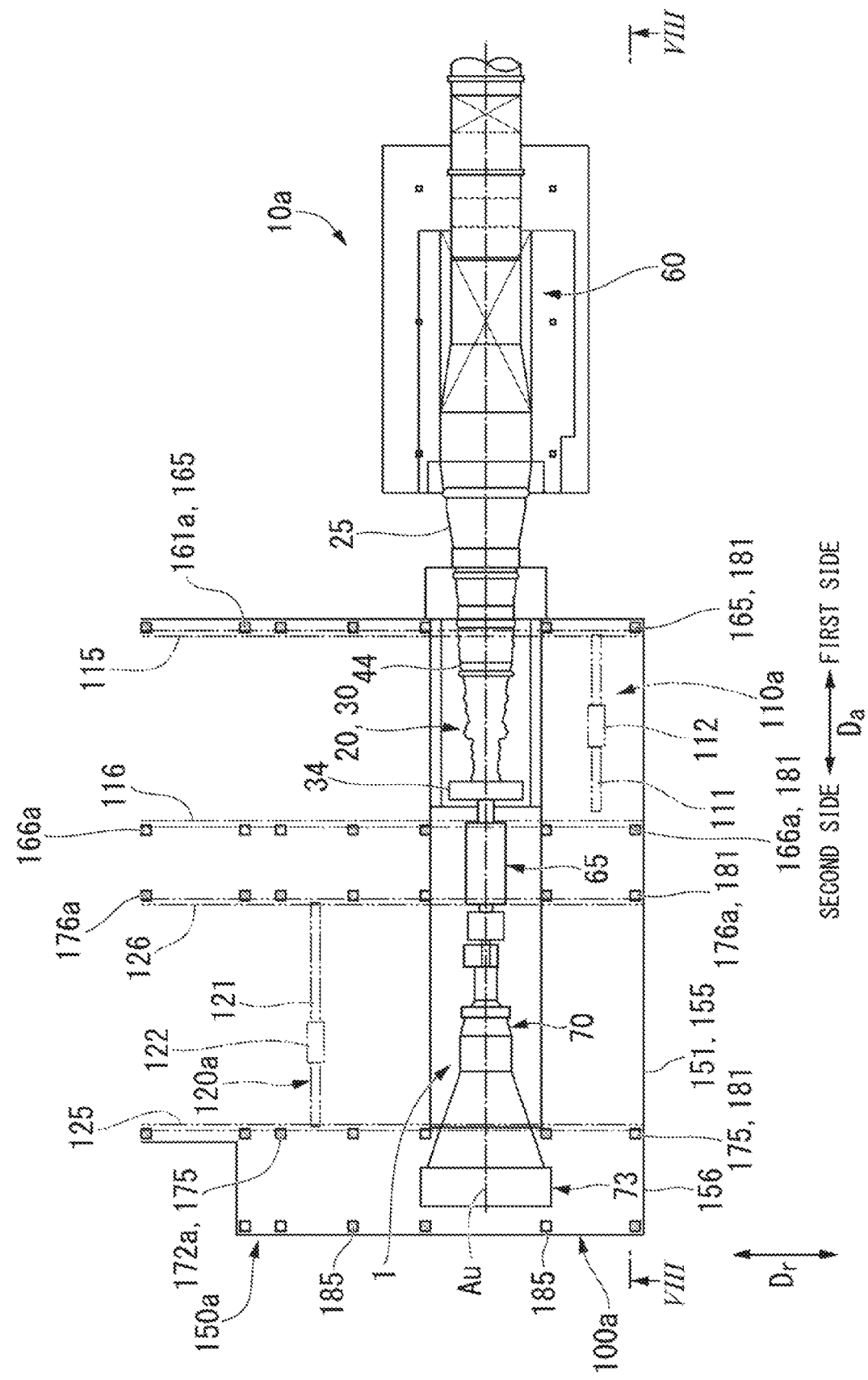
FIG. 7 is a plan view of the major part of the combined cycle plant in the second embodiment according to the present invention.

As shown in FIG. 6 and FIG. 7, the single-shaft combined unit 1 of this embodiment also includes the steam turbine 70, the generator 65, and the gas turbine 30, which are arrayed in this order in the axial direction Da and coupled to one another.

Figure 8:
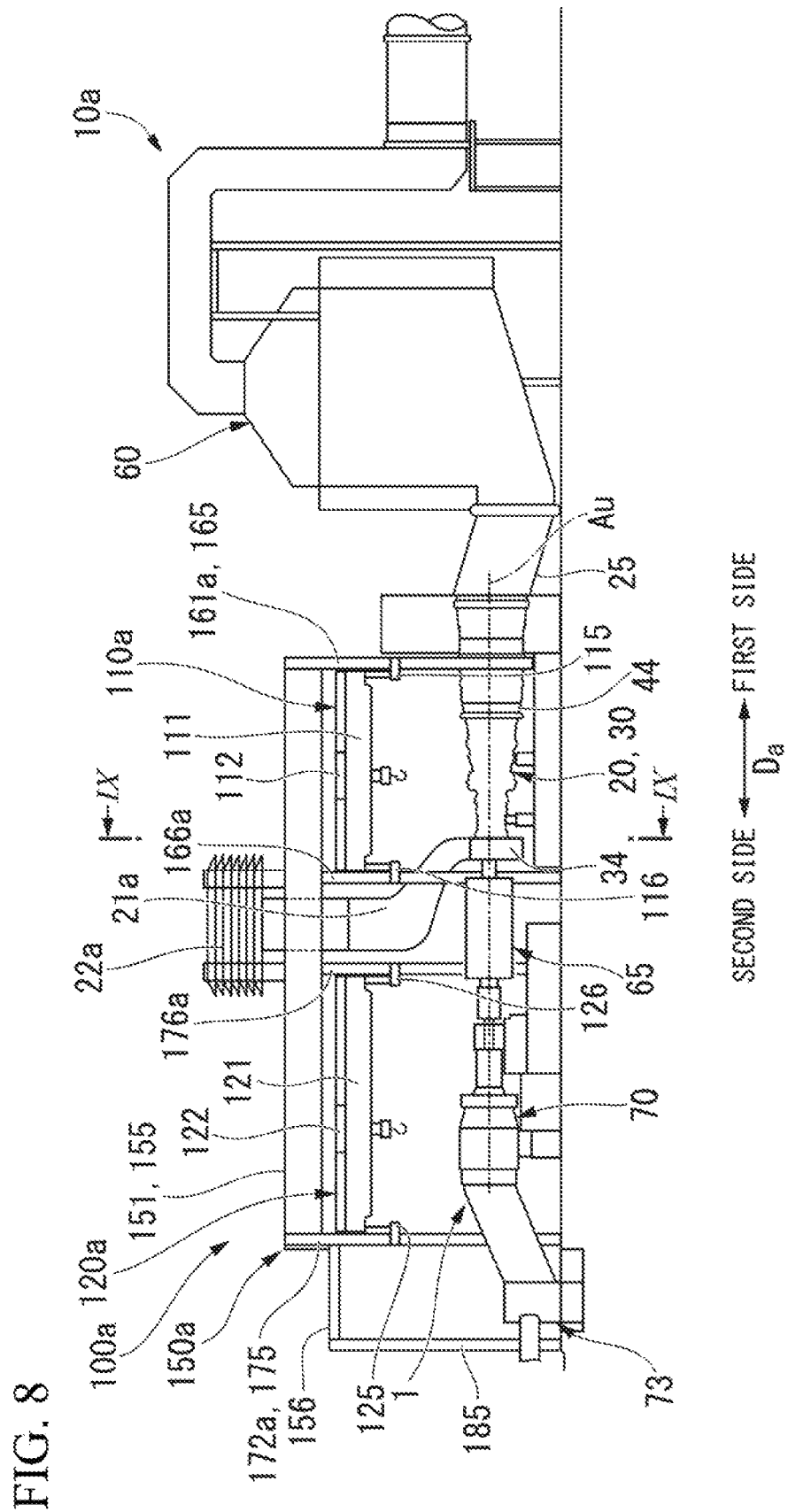
FIG. 8 is a sectional view taken along the line VIII-VIII of FIG. 7.

As shown in FIG. 8 and FIG. 9, as in the first embodiment, the intake air filter 22a connected to the single-shaft combined unit 1 is disposed in an imaginary plane that spreads in the vertical direction so as to include the axis Au of the single-shaft combined unit 1. However, unlike the intake air filter of the first embodiment, the intake air filter 22a is disposed on the upper side relative to the gas turbine 30, directly above the generator 65. Thus, even when the intake air filter 22a is disposed directly above the generator 65, as long as the intake air filter 22a is disposed in the above-mentioned imaginary plane, it is possible as in the first embodiment to narrow the interval between the plurality of single-shaft combined units 1 in the array direction Dr and effectively use the space therebetween.

An intake duct 21a extends from the intake air filter 22a, which is disposed directly above the generator 65, to the intake chamber 34 of the gas turbine 30.

As with the first overhead crane 110 of the first embodiment, the first overhead crane 110a of this embodiment has the first girder 111 that can travel in the array direction Dr across a region including the upper side of the gas turbines 30 of the plurality of single-shaft combined units 1. As with the second overhead crane 120 of the first embodiment, the second overhead crane 120a of this embodiment has the second girder 121 that can travel in the array direction Dr across a region including the upper side of the steam turbines 70 of the plurality of single-shaft combined units 1. However, in this embodiment, as described above, the intake air filter 22a is disposed directly above the generator 65 and the intake duct 21a extends from the generator 65 to the intake chamber 34. In this connection, the girders of the overhead cranes cannot travel in the array direction Dr across the center part of the generators 65 in the axial direction Da. For this reason, the first overhead crane 110a and the second overhead crane 120a are separated from each other in the axial direction Da in this embodiment. In addition, the first overhead crane 110a and the second overhead crane 120a are disposed such that an intermediate part between the overhead crane 110a and the second overhead crane 120a in the axial direction Da is located in the center part of the generator 65 in the axial direction Da.

Specifically, of the pair of first travel rails 115, 116 of the first overhead crane 110a, the first travel rail 115 on the first side is disposed at the position of the exhaust duct 25 in the axial direction Da as in the first embodiment, while the first travel rail 116 on the second side is disposed at the position of the edge of the generator 65 on the first side so as to avoid the center part of the generator 65. On the other hand, of the pair of second travel rails 125, 126 of the second overhead crane 120a, the second travel rail 125 on the second side is disposed on the second side relative to the steam turbine 70 in the axial direction Da as in the first embodiment, while the second travel rail 126 on the first side is disposed at the position of the edge of the generator 65 on the second side so as to avoid the center part of the generator 65 in the axial direction Da.

Thus, in this embodiment, the first girder 111 and the second girder 121 can travel in the array direction Dr so as to avoid the intake air filter 22a disposed directly above the generator 65 and the intake duct 21a connected thereto.

Thus, in this embodiment, the first travel rail 116 on the second side of the pair of first travel rails 115, 116 and the second travel rail 126 on the first side of the pair of second travel rails 125, 126 are separated from each other in the axial direction Da. In this connection, the arrangement etc. of first support columns 161a that support the pair of first travel rails 115, 116 and second support columns 172a that support the pair of second travel rails 125, 126 of this embodiment are also different from those of the first embodiment. Specifically, first inner support columns 166a that support the first travel rail 116 on the second side of the pair of first travel rails 115, 116 and second inner support columns 176a that support the second travel rail 126 on the first side of the pair of second travel rails 125, 126 are formed as separate bodies and are separated from each other in the axial direction Da. In this embodiment, too, the support columns including the first inner support columns 166a and the second inner support columns 176a also support the roof 151.

Thus, this embodiment can offer advantages similar to those of the first embodiment. That is, in this embodiment, too, the period of inspection and repair of one single-shaft combined unit 1 can be shortened, since the plant building includes the first overhead crane 110a that has the first girder 111 capable of traveling in the array direction. Dr across a region including the upper side of the gas turbines 30 of the plurality of single-shaft combined units 1 and the overhead crane 120a that has the second girder 121 capable of traveling in the array direction Dr across a region including the upper side of the steam turbines 70 of the plurality of single-shaft combined units 1. Moreover, in this embodiment, too, each of the three or more single-shaft combined units 1 can be repaired and inspected with the two overhead cranes 110a, 1120a, and the manufacturing costs of the plant building 100a can be kept down compared with when an overhead crane is provided for each of the plurality of single-shaft combined units 1.

In this embodiment, too, it is possible to shorten the span between the columns in the axial direction Da and keep down the construction costs of the plant building 100a by disposing the support columns, which also support the roof 151, in the region where the generators 65 are located in the axial direction Da.

In the case where the intake air filter is provided above the generator, in this embodiment, the intake air filter 22a can be supported by the first inner support columns 166a supporting the first travel rail 116 on the second side of the pair of first travel rails 115, 116 and the second inner support columns 176a supporting the second travel rail 126 on the first side of the pair of second travel rails 125, 126. Thus, in this embodiment, the same structure can be used as the support structure for the intake air filter 22a and the support structure for the travel rails 116, 126, and the construction costs of the plant building 100a can be kept down from this point of view as well.

While the support parts supporting the travel rails and the roof are columns in the above embodiments, these support parts do not have to be columns but may be walls, for example.

In the single-shaft combined unit 1 of the above embodiments, the gas turbine 30, the generator 65, and the steam turbine 70 are disposed in this order in the axial direction Da. However, the single-shaft combined unit may have the generator 65, the gas turbine 30, and the steam turbine 70 disposed in this order, or may have the gas turbine 30, the steam turbine 70, and the generator 65 disposed in this order, in the axial direction Da. However, from the viewpoint of the operability of the first overhead crane 110 relative to a part of the gas turbine 30 on the steam turbine side and the operability of the second overhead crane 120 relative to a part of the steam turbine 70 on the gas turbine side, it is preferable that the single-shaft combined unit 1 has the gas turbine 30, the generator 65, and the steam turbine 70 disposed in this order in the axial direction Da as in the above embodiments.

INDUSTRIAL APPLICABILITY

According to one aspect of the present invention, the period of repair and inspection of single-shaft combined units can be shortened. According to another aspect of the present invention, the construction costs of a plant building of single-shaft combined units can be kept down.

REFERENCE SIGNS LIST

1 Single-shaft combined unit
10, 10a Combined cycle facility
20 Gas turbine facility
21, 21a Intake duct
22, 22a Intake air filter
25 Exhaust duct
30 Gas turbine
31 Compressor
35 Combustor
41 Turbine
60 Exhaust heat recovery boiler
65 Generator
70 Steam turbine
73 Condenser
100, 100a Plant building
110 First overhead crane
111 First girder
112 First hoist
115, 116 First travel rail
120 Second overhead crane
121 Second girder
122 Second hoist
125, 126 Second travel rail
150, 150a Building main body
151 Roof
155 First roof
156 Second roof
161, 161a First support column (first support part)
165 First outer support column (first outer support part)
166, 166a First inner support column (first inner support part)
172, 172a Second support column (second support part)
175 Second outer support column (second outer support part)
176, 176a Second inner support column (second inner support part)

The invention claimed is:
1. A plant building of a combined cycle plant that includes a plurality of single-shaft combined units each having a gas turbine, a generator, and a steam turbine disposed on a same axis, the axes of the plurality of single-shaft combined units being parallel to one another, the plant building comprising:
    a building main body having a roof that continues in an array direction in which the plurality of single-shaft combined units are arrayed and covers an upper side of the plurality of single-shaft combined units;
    a first overhead crane that is disposed inside the building main body, and has a girder capable of traveling in the array direction across a region including the upper side of the gas turbines of the plurality of single-shaft combined units; and a second overhead crane that is disposed inside the building main body, and has a girder capable of traveling in the array direction across a region including the upper side of the steam turbines of the plurality of single-shaft combined units, wherein the first overhead crane and the second overhead crane each have a pair of travel rails that are parallel to each other and extend in the array direction, and the girders are respectively supported by the pairs of travel rails so as to be able to travel in the array direction, wherein the building main body has first support parts that support each of the pair of travel rails of the first overhead crane and second support parts that support each of the pair of travel rails of the second overhead crane, wherein the first support parts include first outer support parts and first inner support parts that respectively support, of the pair of travel rails of the first overhead crane, one travel rail on a first side that is the side of the gas turbine from the steam turbine in an axial direction in which the axis extends, and the other travel rail on a second side that is opposite from the first side, the second support parts include second inner support parts and second outer support parts that respectively support one travel rail on the first side and the other travel rail on the second side of the pair of travel rails of the second overhead crane, and the first inner support parts and the second inner support parts together constitute integral support parts, and wherein the first support parts and the second support parts also support the roof.

2. The plant building according to claim 1, wherein
the generator of the single-shaft combined unit is disposed between the gas turbine and the steam turbine in the axial direction in which the axis extends,
the first overhead crane is disposed on the first side that is the side of the gas turbine from the steam turbine in the axial direction,
the second overhead crane is disposed on the second side that is the side of the steam turbine from the gas turbine in the axial direction, and
the first inner support parts and the second inner support parts are disposed in a region where the generators are located in the axial direction.

3. A combined cycle plant comprising:
the plant building according to claim 1;
the plurality of single-shaft combined units;
an intake duct that is provided for each of the plurality of single-shaft combined units and guides air to the gas turbine, and an intake air filter that removes foreign substances contained in air flowing into the intake duct; and
an exhaust heat recovery boiler that is provided for each of the plurality of single-shaft combined units and generates steam with the heat of exhaust gas discharged from the gas turbine.

4. The combined cycle plant according to claim 3, wherein the intake air filter is disposed on the upper side relative to the gas turbine.

5. The combined cycle plant according to claim 3, wherein the intake air filter is disposed in an imaginary plane that spreads in the vertical direction so as to include the axis of the single-shaft combined unit provided with the intake air filter.

6. The combined cycle plant according to claim 3, wherein the intake air filter is disposed on the lower side relative to the gas turbine.

7. The combined cycle plant according to claim 6, wherein the intake air filter is disposed under the exhaust heat recovery boiler.

8. A combined cycle plant comprising:
the plant building according to claim 2;
the plurality of single-shaft combined units;
an intake duct that is provided for each of the plurality of single-shaft combined units and guides air to the gas turbine, and an intake air filter that removes foreign substances contained in air flowing into the intake duct; and
an exhaust heat recovery boiler that is provided for each of the plurality of single-shaft combined units and generates steam with the heat of exhaust gas discharged from the gas turbine, wherein
the intake air filter is disposed above the generator.

* * * * *